United States Patent [19]
Groves et al.

[11] Patent Number: 5,483,748
[45] Date of Patent: Jan. 16, 1996

[54] SOUND INDICATIVE LEVELING APPARATUS

[76] Inventors: Lyle W. Groves; Martha R. Groves, both of 15607 Mottley Dr., La Mirada, Calif. 90638; John D. Hamtil, 10222 Jennrich Ave., Garden Grove, Calif. 92643

[21] Appl. No.: 285,215

[22] Filed: Aug. 3, 1994

[51] Int. Cl.$^6$ ............................................. G01C 9/06
[52] U.S. Cl. ................................. 33/366; 33/373
[58] Field of Search ........................... 33/366, 373, 374, 33/375, 377, 379, 384

[56] References Cited

U.S. PATENT DOCUMENTS

| | | | |
|---|---|---|---|
| 1,284,879 | 11/1918 | Donaldson | 33/373 |
| 2,541,641 | 2/1951 | Dodson | 33/373 |
| 3,225,451 | 12/1965 | Olexson et al. | 33/384 X |
| 4,343,093 | 8/1982 | Eadens | 33/373 |
| 4,346,363 | 8/1982 | Wilhelmson | 33/366 X |
| 4,493,155 | 1/1985 | Comeau et al. | 33/366 |
| 4,551,921 | 11/1985 | Puyo et al. | 33/366 |
| 4,603,484 | 8/1986 | Strothmann | 33/366 |
| 4,606,133 | 8/1986 | Mills | 33/366 |

FOREIGN PATENT DOCUMENTS

| | | | |
|---|---|---|---|
| 2207751 | 2/1989 | United Kingdom | 33/366 |

*Primary Examiner*—Alvin Wirthlin

[57] ABSTRACT

A sound indicative leveling apparatus comprising an arcuate leveling tube having free and sealed ends extended upwards; a coupling mechanism for securing an external object to be leveled above or below the leveling tube; leveling circuitry further comprising a power source for supplying electrical energy; oscillation circuitry coupled to the power source and adapted to be keyed by an oscillation activation signal for generating speaker activation signals at given frequencies; a speaker coupled to the oscillation circuitry for generating audible tones upon receipt of the speaker activation signals; a switch mechanism disposed along the leveling tube and extended therein and coupled between the oscillator circuitry and the power source; and liquid conductive material disposed within the leveling tube of an amount to electrically engage the switch mechanism based upon leveling tube orientation and thereby generate an oscillator activation signal.

2 Claims, 4 Drawing Sheets

SOUND INDICATIVE LEVELING APPARATUS

BACKGROUND OF THE INVENTION

1. Field of the Invention

The present invention relates to a sound indicative leveling apparatus and more particularly pertains to leveling an object and providing an audible indication of the degree of levelness obtained with a sound indicative leveling apparatus.

2. Description of the Prior Art

The use of leveling mechanisms is known in the prior art. More specifically, leveling mechanisms heretofore devised and utilized for the purpose of leveling objects are known to consist basically of familiar, expected and obvious structural configurations, notwithstanding the myriad of designs encompassed by the crowded prior art which have been developed for the fulfillment of countless objectives and requirements.

By way of example, U.S. Pat. Des. No. 270,716 to Karlsson et al. discloses a bubble level device for a cutter nozzle. U.S. Pat. Des. No. 330,682 to Butler et al. discloses a carpenter's level. U.S. Pat. No. 4,062,003 to George discloses a one-level magnetic bubble switching device. U.S. Pat. No. 4,860,459 to Dengler discloses a bubble level. U.S. Pat. No. 4,908,949 to Jaccard discloses an air-bubble level for portable tools.

While these devices fulfill their respective, particular objective and requirements, the aforementioned patents do not describe a sound indicative leveling apparatus that allows objects to be leveled through the use of audible tones.

In this respect, the sound indicative leveling apparatus according to the present invention substantially departs from the conventional concepts and designs of the prior art, and in doing so provides an apparatus primarily developed for the purpose of leveling an object and providing an audible indication of the degree of levelness obtained.

Therefore, it can be appreciated that there exists a continuing need for new and improved sound indicative leveling apparatus which can be used for leveling an object and providing an audible indication of the degree of levelness obtained. In this regard, the present invention substantially fulfills this need.

SUMMARY OF THE INVENTION

The present invention provides an improved sound indicative leveling apparatus. As such, the general purpose of the present invention, which will be described subsequently in greater detail, is to provide a new and improved sound indicative leveling apparatus and method.

To attain this, the present invention essentially comprises, in combination, a rigid housing having a curved upper portion with an upwardly arcuate tubular aperture disposed therethrough, a hollow rectangular lower portion extended downwards from the upper portion, and a pair of spaced and parallel lips extended downwards from the lower portion. A rigid leveling tube is included and disposed within the aperture of the housing with the leveling tube having a central axis and free and sealed ends extended upwards. A rigid clamp is included and has a C-shaped member with an upper leg, lower leg, cross leg, and mouth therebetween, and a threaded bolt extended through the lower leg and into the mouth for securing an object placed therein for leveling. The upper leg further includes a pair of slots formed thereupon mateable with the lips of the housing for placing the upper leg and lower leg in an orientation generally aligned with the central axis of the leveling tube. The upper leg and the lower leg each further include a pair of opposed slots formed thereon with a slot of the upper leg in combination with an adjacent slot of the lower leg mateable with the lips of the housing for placing the upper leg and lower leg in another orientation generally perpendicular to the central axis of the leveling tube. An elongated chain is included and has its ends secured in a closed loop configuration to the upper portion of the housing at a location aligned about the midpoint of the leveling tube, thereby enabling the housing to be hung from objects for leveling. Leveling circuitry is provided. The leveling circuitry includes a replaceable battery disposed within the housing for supplying electrical energy. The leveling circuitry includes oscillation circuitry coupled to the battery and having an input adapted for receiving an oscillation activation signal, an output for generating speaker activation signals at a given frequency based upon receipt of an oscillation activation signal, and a potentiometer coupled thereto and extended from and the housing for allowing adjustment of the frequency of the speaker activation signals. The leveling circuitry includes a speaker disposed within the housing, coupled to the output of the oscillation circuitry, and extended therefrom for generating audible tones upon receipt of the speaker activation signals. The leveling circuitry includes first, second, third, fourth, and fifth spaced and electrically conductive terminals disposed along the leveling tube and extended therein with each terminal having a first contact and a second contact and with the first terminal positioned at the midpoint of the leveling tube, the second terminal and third terminal symmetrically positioned on the leveling tube about the first terminal, the fourth terminal positioned on the leveling tube between the first terminal and second terminal, and the fifth terminal positioned on the leveling tube between the first terminal and third terminal. The first contact of each terminal is coupled to the input of the oscillation circuitry. The leveling circuitry includes a resistive network disposed within the housing and comprised of different valued resistors with each resistor coupled between a separate second contact of a terminal and the battery and each resistor associated with the oscillation circuitry for controlling the frequency of the speaker activation signals generated therefrom. Lastly, the leveling circuitry includes liquid mercury disposed within the leveling tube of an amount to electrically engage a single terminal based upon leveling tube orientation and thereby generate an oscillator activation signal. When the housing is secured to an object for leveling, audible tones will be generated at a given frequency based upon the degree of levelness attained.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is another object of the present invention to provide a new and improved sound indicative leveling apparatus which may be easily and efficiently manufactured and marketed.

It is a further object of the present invention to provide a new and improved sound indicative leveling apparatus which is of durable and reliable construction.

An even further object of the present invention is to provide a new and improved sound indicative leveling apparatus which is susceptible of a low cost of manufacture with regard to both materials and labor, and which accordingly is then susceptible of low prices of sale to the consuming public, thereby making such a sound indicative leveling apparatus economically available to the buying public.

Still yet another object of the present invention is to provide a new and improved sound indicative leveling apparatus which provides in the apparatuses and methods of the prior art some of the advantages thereof, while simultaneously overcoming some of the disadvantages normally associated therewith.

Even still another object of the present invention is to provide a new and improved sound indicative leveling apparatus for leveling an object and providing an audible indication of the degree of levelness obtained.

Lastly, it is an object of the present invention to provide a new and improved sound indicative leveling apparatus comprising an arcuate leveling tube having free and sealed ends extended upwards; coupling means for securing an external object to be leveled above or below the leveling tube; leveling circuitry further comprising a power source for supplying electrical energy; oscillation circuitry coupled to the power source and adapted to be keyed by an oscillation activation signal for generating speaker activation signals at given frequencies; a speaker coupled to the oscillation circuitry for generating audible tones upon receipt of the speaker activation signals; switch means disposed along the leveling tube and extended therein and coupled between the oscillator circuitry and the power source with the switch means further associated with the oscillation circuitry for controlling the frequency of the speaker activation signals generated therefrom; and liquid conductive material disposed within the leveling tube of an amount to electrically engage the switch means based upon leveling tube orientation and thereby generate an oscillator activation signal; whereby when the leveling tube is secured to an object for leveling, audible tones will be generated at a given frequency based upon the degree of levelness attained.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
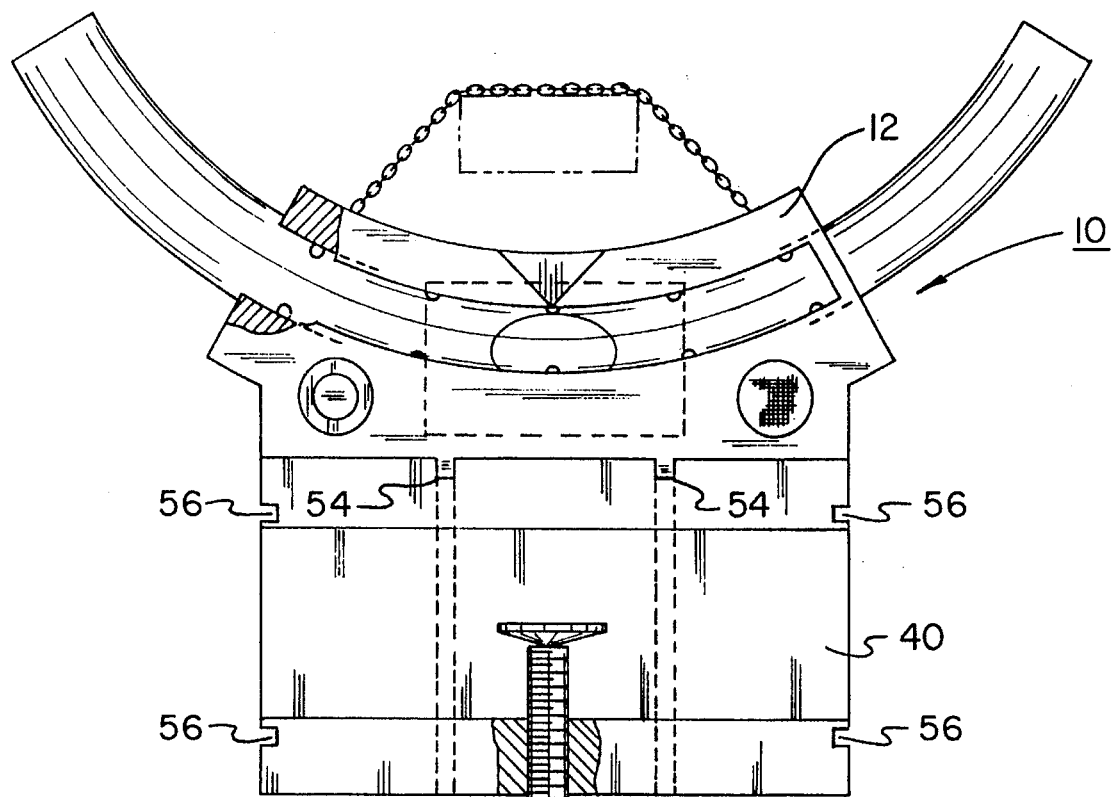
FIG. 1 is a side-elevational view of the preferred embodiment constructed in accordance with the principles of the present invention with the clamp positioned at an orientation for holding generally horizontally aligned objects.

With reference now to the drawings, and in particular, to FIG. 1 thereof, the preferred embodiment of the new and improved sound indicative leveling apparatus embodying the principles and concepts of the present invention and generally designated by the reference number 10 will be described.

Specifically, the present invention includes five major components. The major components are the housing, leveling tube, clamp, chain, and leveling circuitry. These components are interrelated to provide the intended function.

Figure 3:
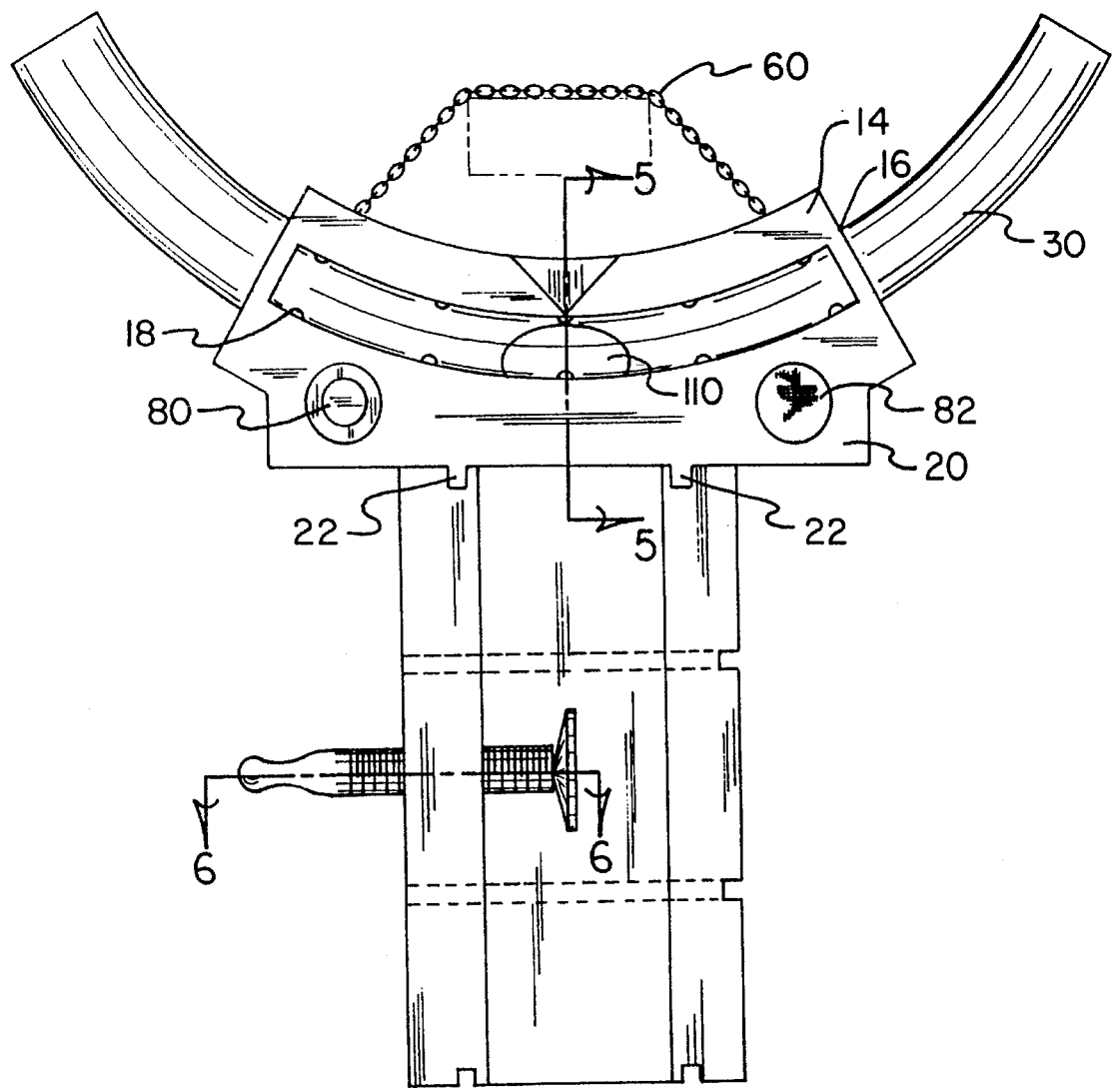
FIG. 3 is yet another side-elevational view of the present invention with the clamp positioned at an orientation for holding generally vertically aligned objects.

More specifically, it will be noted in the various Figures that the first major component is the housing 12. As best illustrated in FIGS. 1 and 3, the housing is formed of plastic or other similar rigid material. It has a curved upper portion 14 with an upwardly arcuate tubular aperture 16 disposed therethrough. A arcuate window 18 is disposed along the upper portion of the housing and aligned with the aperture. The housing has a hollow rectangular lower portion 20 extended downwards from the upper portion. This lower portion has an essentially rectangular cross-section. The housing also includes a pair of spaced and parallel lips 22 extended downwards from the lower portion.

The second major component is the leveling tube 30. The leveling tube is formed of plastic or glass. It is disposed within the aperture 16 of the housing. The leveling tube is thus viewable through the window 18 of the housing. The leveling tube has a central axis and free and sealed ends extended upwards above the upper portion of the housing. The leveling tube is the component that provides a means for making leveling measurements.

Figure 2:
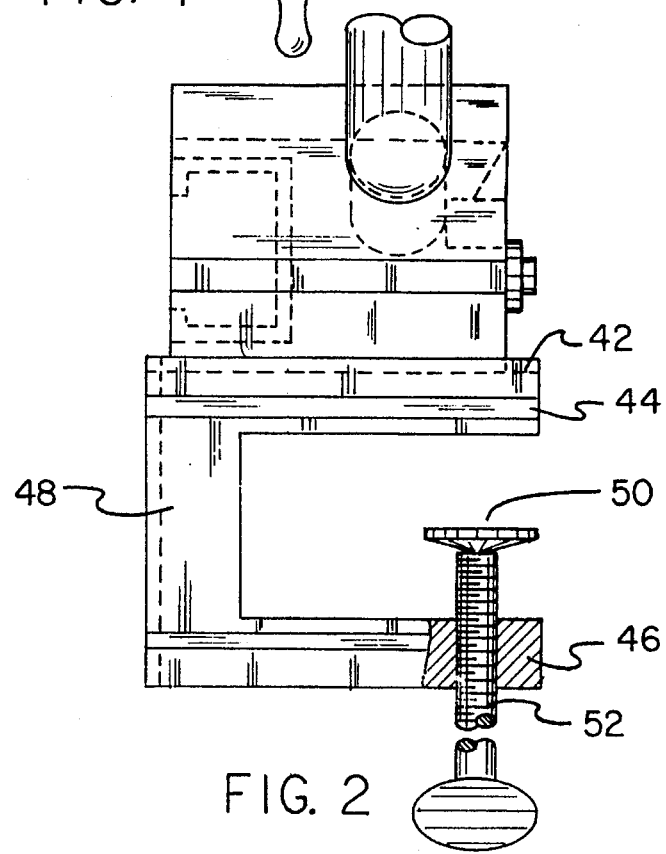
FIG. 2 is yet another side-elevational view of the present invention.
Figure 6:
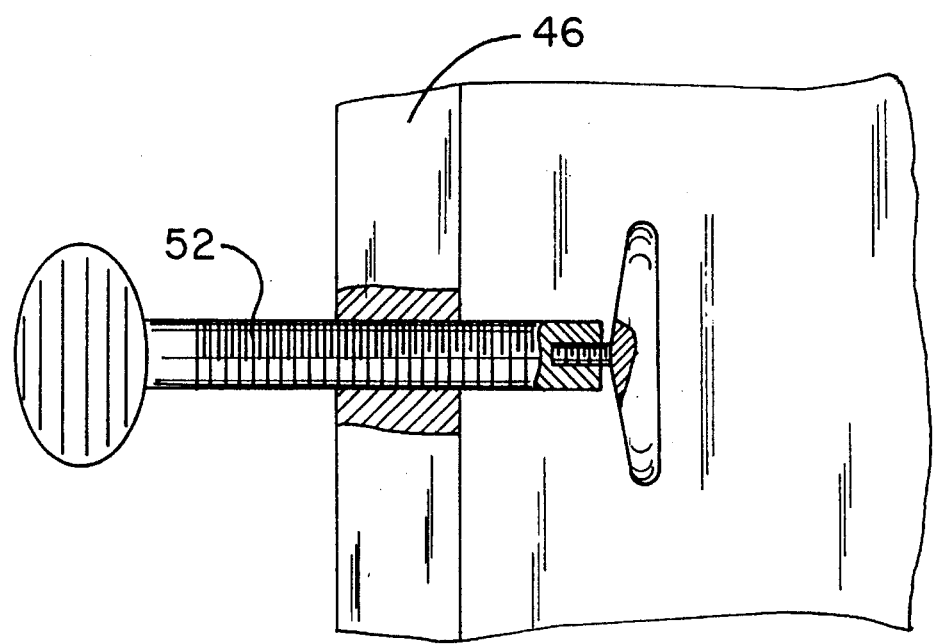
FIG. 6 is a cross-sectional view of the present invention taken along the line 6—6 of FIG. 3.

The third major component is the clamp 40. Referring to FIGS. 1 and 2, the clamp is formed of metal or other similar rigid material. It has a C-shaped member 42 with an upper leg 44, lower leg 46, cross leg 48, and a mouth 50 therebetween. The clamp also includes a threaded bolt 52 extended through the lower end and into the mouth as shown in FIG. 6. The bolt has a flat and pivotable tip end and an oblong handle for allowing a user a firm grip. The bolt is used for securing an object placed within the mouth to the clamp for leveling. The clamp is coupleable to the housing in one of two modes. The upper leg of the clamp has a pair of slots 54 formed thereon, and these slots are mateable with the lips 22 of the housing in a first mode for placing the upper leg and lower leg in an orientation generally aligned with the central axis of the leveling tube. In this configuration, generally horizontally aligned objects may be placed into the mouth of the clamp for leveling. The upper leg and lower leg each further have a pair of opposed slots 56 formed thereon with a slot of the upper leg in combination with an adjacent slot of the lower leg mateable with the lips 22 of the housing in a second mode for placing the upper leg and lower leg in another orientation generally perpendicular to the central axis of the leveling tube. In this configuration, generally vertically aligned objects may be positioned into the mouth of the clamp for leveling.

The fourth major component is the elongated chain 60 as shown in FIG. 3. The elongated chain is composed of a plurality of rigid links coupled together. The chain has its ends secured in a closed loop configuration to the upper portion 14 of the housing with the loop positioned at a location aligned about the mid-point of the leveling tube 30. In this configuration, the housing may be hung from objects for performing leveling measurements.

Figure 5:
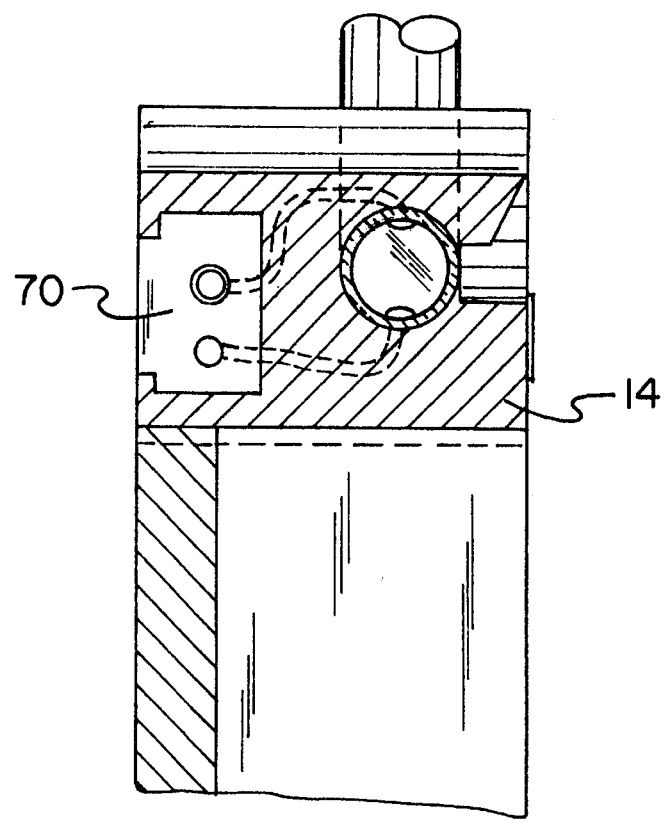
FIG. 5 is a cross-sectional view of the present invention taken along the line 5—5 of FIG. 3.
Figure 7:
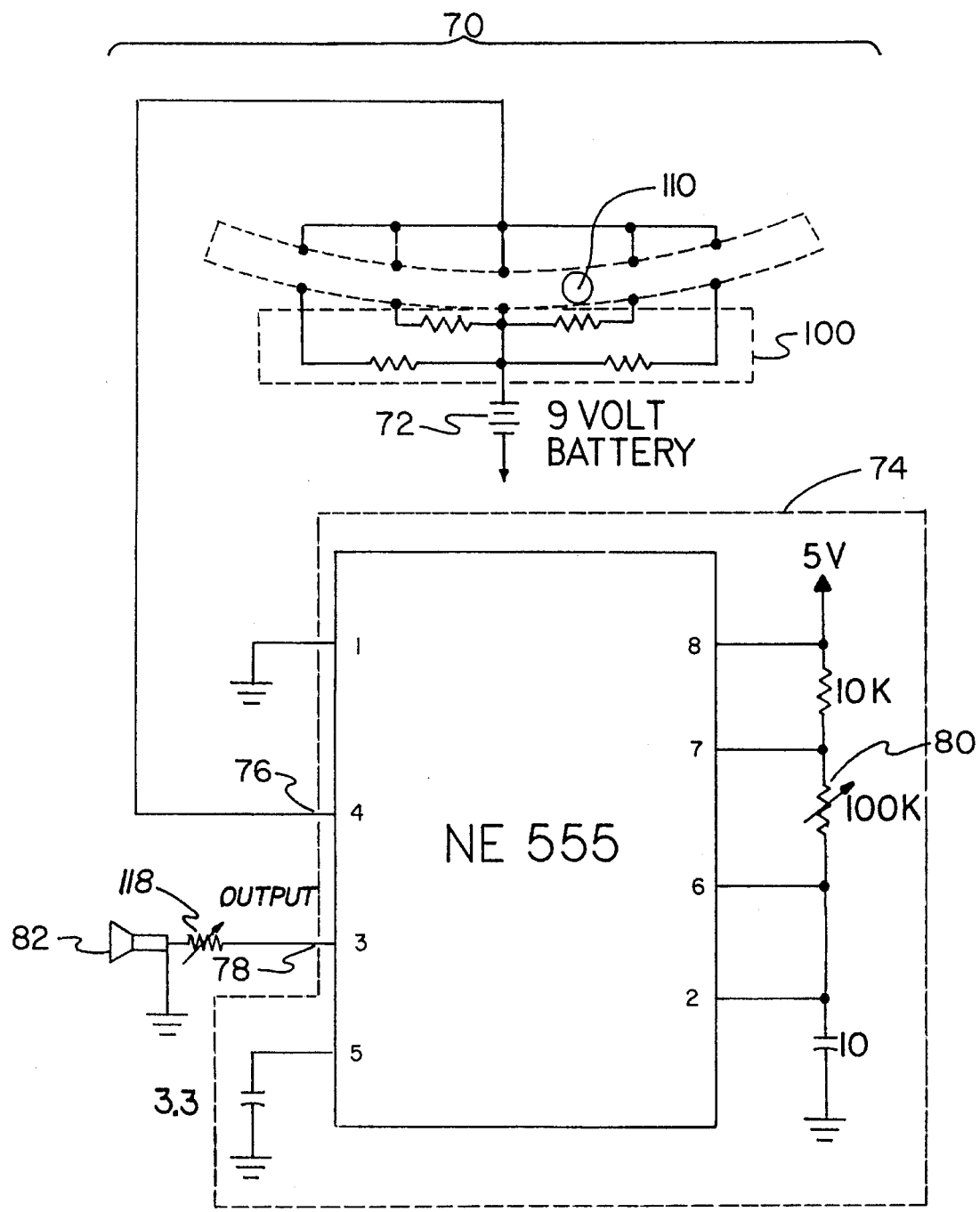
FIG. 7 is a schematic representation of the leveling circuitry of the present invention.

The fifth major component is the leveling circuitry 70 as depicted in FIGS. 5 and 7. The leveling circuitry is operable when electrically energized. The leveling circuitry includes six subcomponents. The subcomponents are the battery, oscillation circuitry, speaker, terminals, resistive network, and liquid mercury. These subcomponents are interrelated for allowing the leveling circuitry to perform its intended function.

The first subcomponent of the leveling circuitry is the battery 72. The battery is disposed within the housing for supplying electrical energy. The battery may be replaced when its electrical energy has been expended. Conventional and commercially available embodiments of batteries may be utilized with the present invention. In the preferred embodiment, a 9 volt battery is utilized.

The second subcomponent of the leveling circuitry is the oscillation circuitry 74. The oscillation circuitry is operable when electrically energized through electrical energy provided from the battery 72. The oscillation circuitry has an input 76 adapted for receiving an oscillation activation signal. The oscillation circuitry also has an output 78 for generating speaker activation signals at a given frequency. The speaker activation signals are generated when keyed by an input oscillation activation signal. Lastly, the oscillation circuitry has a potentiometer 80 coupled thereto and extended from the housing 12. The potentiometer allows the adjustment of the frequency of the speaker activation signals. In the preferred embodiment, a commercially available 555 timer is utilized. The 555 timer includes 23 transistors, 2 diodes, and 16 resistors on a silicon chip installed in an 8-pin mini dual-in-line package. The 555 timer operates in an astable mode as an oscillator. Pins 2 and 6 of the 555 timer are connected so that the circuit will trigger itself each timing cycle and oscillate. The frequency of the speaker activation signals is dependent on the resistance and capacitance seen at pins 2, 6, 7, and 8 of the 555 timer. These pins essentially define the timing control for the oscillation circuitry. Resistive and capacitive elements coupled to these pins are selected to set the frequency range of the output speaker activation signals. In the preferred embodiment, a 10 kilo ohm resistor, a 100 kilo ohm resistor, and a 10 microfarad capacitor are utilized. The capacitor at pin 5 of the 555 timer prevents false triggering of the timer. In the preferred embodiment, a 3.3 microfarad capacitor is used. The oscillation activation signal is provided at pin 5 of the 555 timer.

The third subcomponent of the leveling circuitry is the speaker 82. The speaker is coupled to the output 78 of the oscillation circuitry. The speaker is extended from the housing for generating audible tones upon receipt of the speaker activation signals. The frequency of the audible tone generated by the speaker is directly related to the frequency of the speaker activation signals generated by the oscillation circuitry. Conventional and commercially available speakers may be utilized.

Figure 4:
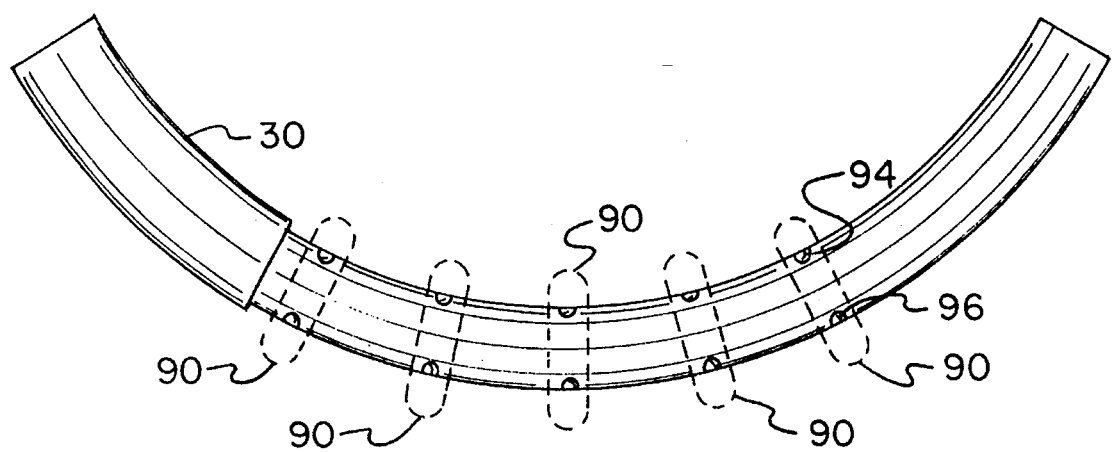
FIG. 4 is a cross-sectional view of the leveling tube and electrically-conductive contacts associated therewith.

The fourth subcomponent of the leveling circuitry is the terminals 90 as shown in FIG. 4. The present invention includes a first, second, third, fourth, and fifth terminal. Each terminal is electrically conductive. The terminals are disposed along the leveling tube 30 in at regular intervals with a portion extended therein. Each terminal has a first contact 94 and a second contact 96. The first terminal is positioned at the midpoint of the leveling tube, the second tube and the third terminal are symmetrically positioned on the leveling tube about the first terminal. The fourth terminal is positioned on the leveling tube between the first terminal and the second terminal. The fifth terminal is positioned on the leveling tube between the first terminal and third terminal. The first contact 94 of each terminal is coupled to the input 76 of the oscillation circuitry. Although five terminals are utilized in the preferred embodiment, any number of terminals with varied spacing intervals may be utilized. Their use could be driven by factors such as the leveling application itself or the degree of resolution desired.

The fifth subcomponent of the leveling circuitry is the resistive network 100. The resistive network is comprised of different value resistors. Each resistor is coupled between a separate second contact 96 of a separate terminal and the battery 72. Each resistor is associated with the oscillation circuitry 74 for controlling the frequency of speaker activation signals generated therefrom. This association is through a voltage divider connected between the resistive network and the timing control of the oscillation circuitry, which thereby sets the voltage seen at the timing control at about 5 volts. Various schemes could be utilized to set the values of the resistors. For example, resistors coupled to the second contact of each terminal could be of a different value. This would then allow the oscillation circuitry to generate speaker activation signals at different frequencies when each terminal is activated. Alternatively, the resistors coupled to the second contact of the second and third terminals could have the same value, and the resistors coupled to the second contact of the fourth and fifth terminals could have the same value, albeit different than those coupled to the second contact of second and third terminals. This scheme would then cause the oscillation circuitry to generate speaker activation signals at the same frequency for either the second or third terminal when activated and also cause the oscillation circuitry to generate speaker activation signals at the same frequency for either the fourth or fifth terminal when activated. Various other schemes could also be formulated and used.

The sixth subcomponent of the leveling circuitry is the liquid mercury 110. The liquid mercury is disposed and flowable as an elemental drop within the leveling tube of an amount to electrically engage a single terminal based upon leveling tube orientation. Thus, a mercury bubble switch is formed. When a terminal is electrically engaged, a circuit is completed between the battery and the oscillation circuitry, thereby generating an oscillator activation signal. Therefore, based upon the terminal and associated resistor of the resistive network activated, the oscillation circuitry then generates speaker activation signals at a given frequency. Now, when the housing is secured to an object for leveling and the leveling circuitry is activated, audible tones will be generated at a given frequency based upon the degree of levelness obtained.

A second embodiment of the present invention includes substantially all of the components of the present invention further including volume control circuitry associated with the speaker for allowing control of audible tone volume generated therefrom. This may consist of a variable resistor 118 coupled between the output of the oscillation circuitry 78 and the speaker. A power switch means 120 may be included for allowing the activation of leveling circuitry in one orientation and the de-activation of the leveling circuitry in another orientation. Measurement indicia could also be added to the housing, leveling tube, or combination thereof to provide a quantitative visual indication of leveling measurements.

The present invention is a new type of level designed to make leveling long items easy without having to see the bubble as in prior art leveling devices. It is much smaller than a traditional level and consists of a piece of plastic or glass tubing, a leveling circuit with a 9 volt battery, a mercury bubble switch, a housing, a clamp, and a chain. The piece of tubing is curved and slides into the housing. It may be graduated with indicia to indicate the fall rate and level. The circuit is connected to the mercury bubble switch located at the bottom of the tubing. The present invention is powered by a 9 volt battery, or it can be made to plug into an electrical outlet. The housing has a clamp on the bottom, and a small chain connected to the top of the housing. The present invention works in either a horizontal or a vertical position.

This device utilizes a series of distinct sounds to signify whether an item is level or the distance in inches or by degrees by which it is off. A volume control permits adjusting the sound level so that it can be heard above the noise of other construction activity. The unique design of the present invention allows it to be attached to and used with other carpentry tools such as an electric drill. The present invention can also be made as a snap on part for existing tools, and it could be built into future tools as an additional feature. With the unique sound feature and physical design of the present invention, just one person can level even a long item without having to get down off a ladder or call another person for assistance.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A sound indicative leveling apparatus for leveling an object and providing an audible indication of the degree of levelness obtained comprising, in combination:

a rigid housing having a curved upper portion with an upwardly arcuate tubular aperture disposed therethrough, a hollow rectangular lower portion extended downwards from the upper portion, and a pair of spaced and parallel lips extended downwards from the lower portion;

a rigid leveling tube disposed within the aperture of the housing with the leveling tube having a central axis and free and sealed ends extended upwards;

a rigid clamp having a C-shaped member with an upper leg, a lower leg, and a cross leg coupled between the upper leg and lower leg to thereby create a mouth, a threaded bolt extended through the lower leg and into the mouth for securing an object placed therein for leveling, the upper leg further having a pair of slots formed thereupon mateable with the lips of the housing for placing the upper leg and lower leg in an orientation generally aligned with the central axis of the leveling tube, the upper leg and the lower leg each further having a pair of opposed slots formed thereon with a slot of the upper leg in combination with an adjacent slot of the lower leg mateable with the lips of the housing for placing the upper leg and lower leg in another orientation generally perpendicular to the central axis of the leveling tube;

an elongated chain having its ends secured in a closed loop configuration to the upper portion of the housing at a location aligned about the midpoint of the leveling tube, whereby enabling the housing to be hung from objects for leveling;

leveling circuitry further comprising:

a replaceable battery disposed within the housing for supplying electrical energy;

oscillation circuitry disposed within the housing and coupled to the battery with the oscillation circuitry having an input adapted for receiving an oscillation activation signal, an output for generating speaker activation signals at a given frequency, and a potentiometer for allowing adjustment of the frequency of the speaker activation signals;

a speaker coupled to the output of the oscillation circuitry in the housing and extended therefrom for generating audible tones upon receipt of the speaker activation signals;

first, second, third, fourth, and fifth spaced and electrically conductive terminals disposed along the leveling tube and extended therein with each terminal having a first contact and a second contact and with the first terminal positioned at the midpoint of the leveling tube, the second terminal and third terminal symmetrically positioned on the leveling tube about the first terminal, the fourth terminal positioned on the leveling tube between the first terminal and second terminal, and the fifth terminal positioned on the leveling tube between the first terminal and third terminal, the first contact of each terminal coupled to the input of the oscillation circuitry;

a resistive network disposed within the housing and comprised of different valued resistors with each resistor coupled between a separate second contact of one of the terminals and the battery and each resistor associated with the oscillation circuitry for controlling the frequency of the speaker activation signals generated therefrom; and liquid mercury disposed within the leveling tube of an amount to electrically engage a single terminal based upon leveling tube orientation and thereby generate an oscillator activation signal;

whereby when the housing is secured to an object for leveling, audible tones will be generated at a given frequency based upon the degree of levelness attained.

2. A sound indicative leveling apparatus comprising:

an arcuate leveling tube having free and sealed ends extended upwards;

an adjustable clamp coupled to the tube and removably coupleable to an object for leveling;

leveling circuitry further comprising:

a replaceable battery for supplying electrical energy;

oscillation circuitry coupled to the battery and adapted to be keyed by an oscillation activation signal for generating speaker activation signals at given frequencies;

a speaker coupled to the oscillation circuitry for generating audible tones upon receipt of the speaker activation signals to thereby audibly indicate a degree of levelness attained for the object;

volume control circuitry associated with the speaker for allowing control of audible tone volume generated therefrom;

switch means including a plurality of spaced and electrically conductive terminals disposed along the leveling tube and extended therein and further coupled to the oscillator circuitry for permitting different frequencies to pass through said speaker based on the orientation of said leveling tube; and said switch means further including liquid conductive material disposed within the leveling tube of an amount to electrically engage one of the terminals based upon leveling tube orientation and thereby generate an oscillator activation signal; and power switch means coupled to the leveling circuitry for activating the leveling circuitry in one orientation and deactivating the leveling circuitry in another orientation.

\* \* \* \* \*